(12) United States Patent
Li et al.

(10) Patent No.: US 12,460,800 B1
(45) Date of Patent: Nov. 4, 2025

(54) DOWNWARD HANGING TYPE LAMP

(71) Applicant: Syswit Optoelectronics Technology Co., Ltd., Guangdong (CN)

(72) Inventors: Wenjie Li, Guangdong (CN); Xi Wang, Guangdong (CN); Zhenkai Zhou, Guangdong (CN)

(73) Assignee: SYSWIT OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/940,820

(22) Filed: Nov. 7, 2024

(30) Foreign Application Priority Data

Sep. 13, 2024 (CN) .......................... 202411288681.6

(51) Int. Cl.
| | |
|---|---|
| F21V 21/088 | (2006.01) |
| F41G 1/34 | (2006.01) |
| F41G 1/35 | (2006.01) |
| F41G 1/36 | (2006.01) |
| F41G 3/14 | (2006.01) |
| H04B 1/3883 | (2015.01) |
| H04M 1/02 | (2006.01) |

(52) U.S. Cl.
CPC ........ *F21V 21/088* (2013.01); *F21V 21/0885* (2013.01); *F41G 1/34* (2013.01); *F41G 1/35* (2013.01); *F41G 1/36* (2013.01); *F41G 3/145* (2013.01); *H04B 1/3883* (2013.01); *H04M 1/0262* (2013.01)

(58) Field of Classification Search
CPC ..... F41G 1/34; F41G 1/35; F41G 1/36; F41G 3/145; F21V 21/088; F21V 21/0885; H04M 1/0262; H04B 1/3883
See application file for complete search history.

(56) References Cited

U.S. PATENT DOCUMENTS

| | | | | |
|---|---|---|---|---|
| 5,259,786 | A * | 11/1993 | Huang | H01R 13/2464 429/100 |
| 7,892,668 | B2 * | 2/2011 | Choi | H04B 1/3883 429/97 |
| 8,220,946 | B1 | 7/2012 | Teetzel | |
| 12,235,075 | B1 * | 2/2025 | Carlson | F41G 1/35 |
| 2005/0225933 | A1 * | 10/2005 | Kang | H04M 1/0262 361/679.55 |
| 2007/0010219 | A1 * | 1/2007 | Qin | H04M 1/0262 455/128 |
| 2018/0311807 | A1 * | 11/2018 | Sergyeyenko | H02J 7/0048 |

(Continued)

*Primary Examiner* — Colin J Cattanach

(57) ABSTRACT

Provided is downward hanging type lamp, comprises a lamp body and a battery, and the lamp body comprises a mounting base and an illumination lamp mounted inside the mounting base and electrically connected to the battery; a battery mounting groove is formed on the mounting base, the battery is detachably mounted in the battery mounting groove, a locking screw is arranged in the battery mounting groove, the locking screw penetrates out of a bottom of the mounting base and is connected to an M-LOK nut, and a head of the locking screw is located in the battery mounting groove; and an accommodating groove is formed in the battery mounting groove at a position where the locking screw penetrates out, and the accommodating groove is used for accommodating the head of the locking screw, when the locking screw cooperates with the M-LOK nut to fix the mounting base on the handguard.

5 Claims, 8 Drawing Sheets

(56) References Cited

U.S. PATENT DOCUMENTS

2023/0175814 A1\* 6/2023 Meissen .................. F41C 23/16
                                                    362/11
2023/0228532 A1\* 7/2023 Meissen .................... F41G 1/35
                                                    42/146

\* cited by examiner

//DOWNWARD HANGING TYPE LAMP

TECHNICAL FIELD

The present disclosure relates to the technical field of firearm accessories, in particular to a downward hanging type lamp.

BACKGROUND

With the continuous development of firearm accessories, the demand for downward hanging type lamps mounted on firearm handguards has become increasingly prominent. In the prior art, one method involves fixing the lamp onto the M-LOK® (in the following text, it is simplified as M-LOK) rail of a mechanical handguard through a clamping mechanism, as exemplified by the downward hanging type lamp in patent CN220169328U. However, such clamping mechanisms occupy a significant amount of space, resulting in a bulky overall appearance of the firearm. Another method involves directly tightening the lamp onto the M-LOK rail using locking screws and M-LOK nuts. In such products, the fastening screws need to pass through the entire lamp, leading to inefficient space utilization within the light and necessitating a reduction in battery capacity. Nevertheless, due to the issue of large space occupation by clamping mechanisms in the prior art, these requirements cannot be well met. Therefore, the development of a downward hanging type lamp that, while maintaining a compact form factor, can optimize the clamping mechanism to reduce space occupation and ensure sufficient internal space within the light to increase battery capacity, holds significant practical importance.

SUMMARY

The embodiment of the present disclosure provides a downward hanging type lamp to solve the problem in the prior art where the clamping mechanism occupies too much space, resulting in a relatively reduced space within the lamp for battery installation.

In order to achieve the above object, embodiments of the present disclosure adopt the following technical solutions: is downward hanging type lamp, which is used for being mounted on a handguard of a firearm provided with a M-LOK slot. The downward hanging type lamp comprises a lamp body and a battery, and the lamp body comprises a mounting base and an illumination lamp mounted inside the mounting base and electrically connected to the battery; a battery mounting groove is formed on the mounting base, the battery is detachably mounted in the battery mounting groove, a locking screw is arranged in the battery mounting groove, the locking screw penetrates out of a bottom of the mounting base and is connected to an M-LOK nut, and a head of the locking screw is located in the battery mounting groove; an accommodating groove is formed in the battery mounting groove at a position where the locking screw penetrates out, and the accommodating groove is used for accommodating the head of the locking screw, so that when the locking screw cooperates with the M-LOK nut to fix the mounting base on the handguard, a height of a top of the head of the locking screw is equal to or lower than a height of a bottom surface of the battery mounting groove; and the battery comprises a battery body, and a battery circuit board is arranged in the battery body.

Further, a mounting cavity is formed at one end of the mounting base close to the illumination lamp, a mounting hole that communicates with the battery mounting groove is provided on one side of the mounting cavity close to the battery mounting groove; a battery buckle is arranged in the mounting cavity, the limitation of the battery buckle by the mounting hole only has a linear freedom degree close to or away from the battery mounting groove, and an end portion of the battery buckle close to the battery mounting groove is arranged to extend out of the mounting hole; a buckle reset spring is arranged between one end of the battery buckle away from the battery mounting groove and a side wall of the mounting cavity, the buckle reset spring is used for keeping an initial position of the battery buckle in the mounting cavity, and when the battery buckle is located at the initial position, one end of the battery buckle close to the battery mounting groove extends into the battery mounting groove; and a battery buckle groove hole is provided on one side of the battery body, and when the battery is mounted in the battery mounting groove, an end portion of the battery buckle is arranged to be embedded in the battery buckle groove hole.

Further, an opening is provided above the mounting cavity and a battery replacement button is accommodated, and the battery replacement button only has a longitudinal linear motion degree of freedom under constraint of the mounting cavity; a bottom of the battery replacement button is connected to a bottom wall of the mounting cavity via a button reset spring, a connecting groove capable of accommodating the battery buckle is formed at the bottom of the battery replacement button, the connecting groove divides the bottom of the battery replacement button into two limiting blocks, and the button reset spring is arranged between bottom surfaces of the limiting blocks and a bottom surface of the mounting cavity; and through grooves for the limiting blocks and the button reset spring to longitudinally pass through are formed on two sides of the battery buckle, a first inclined surface is formed on a side face of one of the limiting blocks, a second inclined surface is formed on one side of the through grooves close to the battery replacement button; when the battery replacement button moves downwards, the two limiting blocks move in the through grooves on the two sides of the battery buckle; and the first inclined surface abuts against the second inclined surface, and the battery replacement button can push the battery buckle away from the battery mounting groove when the battery replacement button moves downwards.

Further, a mounting base circuit board is provided at a position in the mounting base below the battery mounting groove, the mounting base circuit board is provided with a contact elastic piece, a bottom of one side of the contact elastic piece is electrically connected to the mounting base circuit board, another side of the contact elastic piece is provided with a protruding portion, the protruding portion of the contact elastic piece is not in contact with the mounting base circuit board, the protruding portion of the contact elastic piece is exposed in the battery mounting groove by means of an opening at a bottom of the battery mounting groove, and an auxiliary spring is arranged between the protruding portion of the contact elastic piece and the mounting base circuit board.

Further, a bottom of the battery body is provided with an electric quantity indicator light and an electric quantity indication touch button, the electric quantity indicator light and the electric quantity indication touch button are electrically connected to the battery circuit board, the electric quantity indication touch button transmits an indication signal displaying electric quantity to the battery circuit board and transmits the indication signal to the electric quantity indicator light via the battery circuit board.

Further, the bottom of the battery body is provided with a battery contact point, and when the battery is mounted in the battery mounting groove, the battery contact point is electrically connected to the mounting base circuit board via the contact elastic piece.

Further, the bottom of the battery body is provided with a Type-C® socket (in the following text, it is simplified as Type-C socket) electrically connected to the battery circuit board.

The beneficial effects of the present disclosure are:

The downward hanging type lamp provided by the present disclosure utilizes the locking screw and the M-LOK nut to securely fasten the lamp body, after the battery has been removed, onto the handguard. This downward hanging type lamp avoids increasing its size and weight due to the clamping mechanism, and also prevents reducing the battery's installable volume by penetrating through the lamp.

DETAILED DESCRIPTION OF THE EMBODIMENTS

Embodiments of the present disclosure will be described in detail below with reference to the accompanying drawings. It should be understood that the embodiments described here are only used to illustrate and explain the present disclosure, and are not intended to limit the present disclosure.

Figure 1:
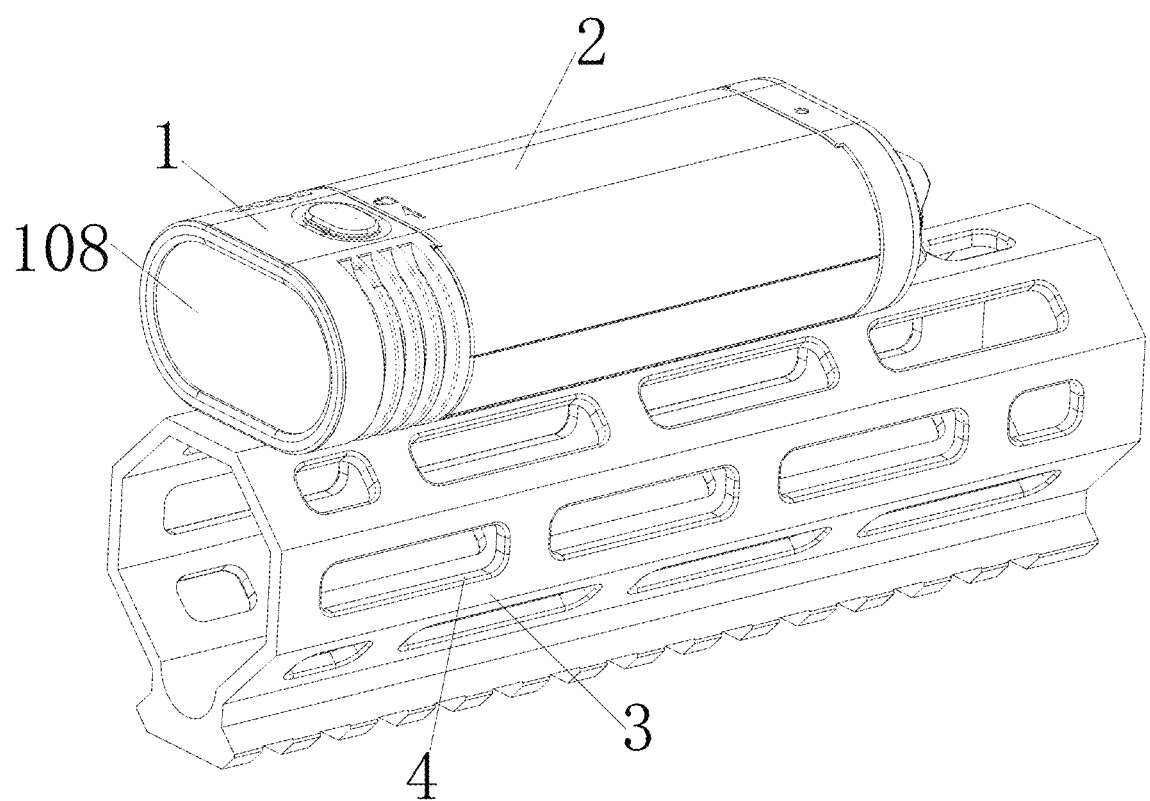
FIG. 1 is a three-dimensional view of a downward hanging type lamp according to an embodiment of the present disclosure.
Figure 2:
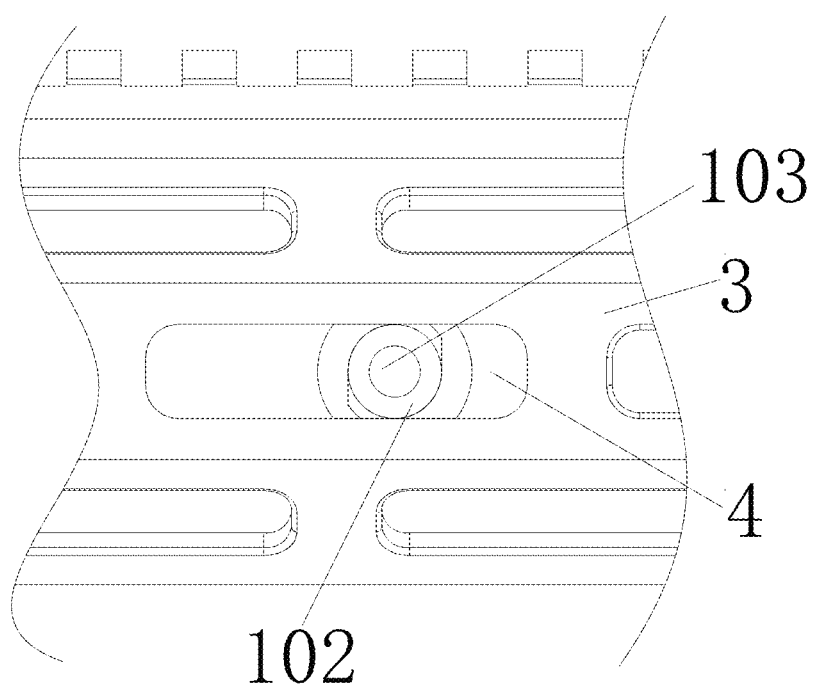
FIG. 2 is a connecting structure diagram of an M-LOK nut and a handguard according to an embodiment of the present disclosure.
Figure 3:
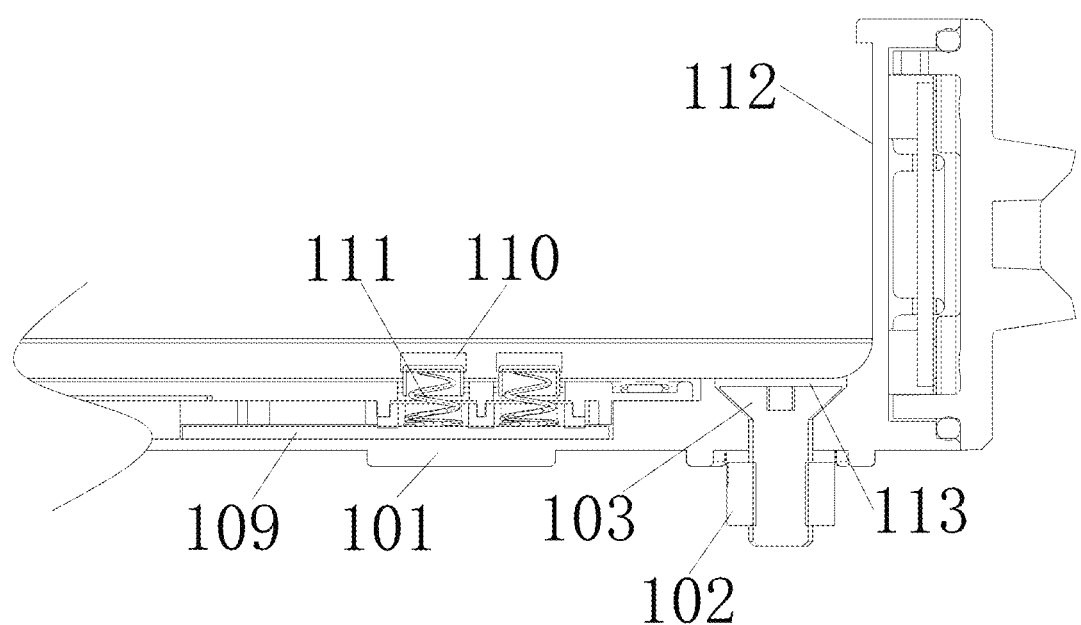
FIG. 3 is a partial cross-sectional view of a mounting base according to an embodiment of the present disclosure.

As shown in FIG. 1 to FIG. 7, the present disclosure provides a downward hanging type lamp, as shown in FIG. 1, used for being mounted on a handguard 3 of a firearm provided with a M-LOK (Modular Lock) slot 4, the downward hanging type lamp comprises a lamp body 1 and a battery 2, the lamp body 1 comprises a mounting base 101 and an illumination lamp 108 mounted inside the mounting base 101, the illumination lamp 108 is electrically connected to the battery 2, and a transparent lampshade is arranged at one end of the mounting base 101 close to the illumination lamp 108, so that light emitted by the illumination lamp 108 can be illuminated to the outside of the mounting base 101 through the transparent lampshade.

The mounting base 101 is used for supporting various components. A battery mounting groove 112 is formed on the mounting base 101, the battery 2 is detachably mounted in the battery mounting groove 112, a locking screw 103 is arranged in the battery mounting groove 112, the locking screw 103 penetrates out of a bottom of the mounting base 101 and is connected to an M-LOK nut 102, and a head of the locking screw 103 is located in the battery mounting groove 112; the M-LOK nut 102 comprises a limiting column and a clamping block, the limiting column is fixedly connected with the clamping block, the limiting column is provided with a limiting body, the limiting column is used for limiting the rotation angle of the M-LOK nut 102 in the M-LOK slot 4, the rotation angle range of the M-LOK nut 102 in the M-LOK slot 4 is 90° (the connection mode between the M-LOK nut 102 and the M-LOK slot 4 exists in multiple embodiments in the prior art, and the specific structure of the M-LOK nut 102 is not described herein).

When the mounting base 101 needs to be mounted on the handguard 3, the locking screw 103 is first loosened. The direction of the limiting column of the M-LOK nut 102 is adjusted to align with the direction of the M-LOK slot 4. The clamping block is then passed through the M-LOK slot 4, followed by inserting the limiting column into the M-LOK slot 4, ensuring that the mounting base 101 is tightly fitted against the handguard 3. The locking screw 103 is subsequently rotated. During this rotation, the limiting portion rotates within the M-LOK slot 4. After the M-LOK nut 102 has rotated 90°, the limiting portion is unable to continue rotating within the M-LOK slot 4, fixing the relative position between the M-LOK nut 102 and the locking screw 103. The clamping block engages with the handguard 3, thereby securing the relative position of the handguard 3 and the mounting base 101.

Figure 6:
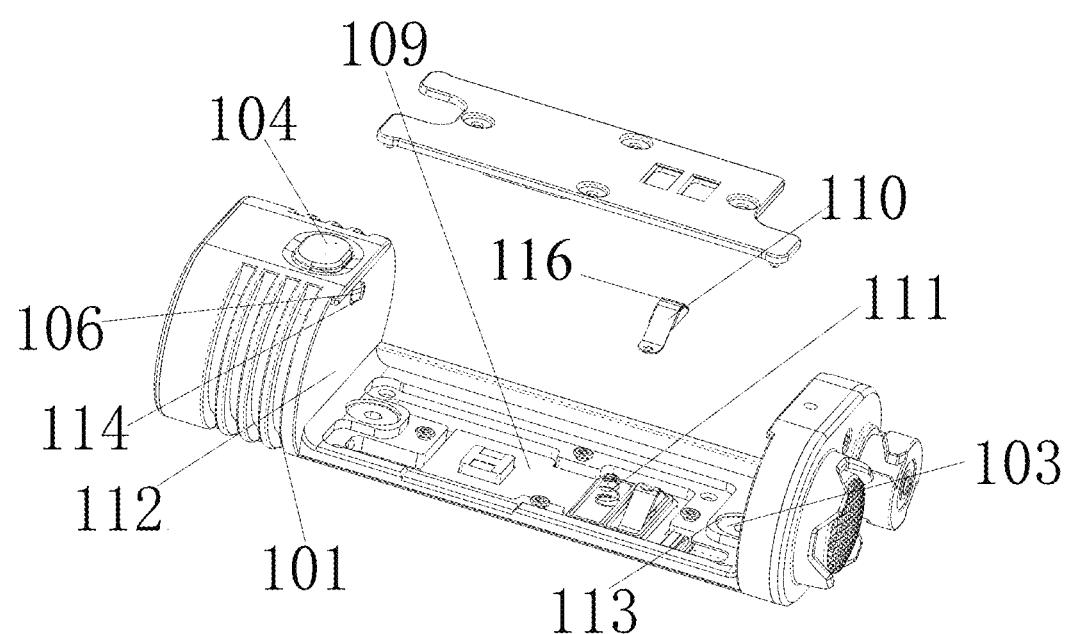
FIG. 6 is a schematic structural diagram of a mounting base according to an embodiment of the present disclosure.

As shown in FIG. 6, an accommodating groove 113 is formed in the battery mounting groove 112 at a position where the locking screw 103 penetrates out, and the accommodating groove 113 is used for accommodating the head of the locking screw 103, so that when the locking screw 103 cooperates with the M-LOK nut 102 to fix the mounting base 101 on the handguard 3, a height of a top of the head of the locking screw 103 is equal to or lower than a height of a bottom surface of the battery mounting groove 112; and the battery 2 comprises a battery body 26, and a battery circuit board 27 is arranged in the battery body 26.

A mounting cavity 115 is formed at one end of the mounting base 101 close to the illumination lamp 108, a mounting hole 114 is provided on one side of the mounting cavity 115 close to the battery mounting groove 112, and the mounting hole 114 is in communication with the battery mounting groove 112; a battery buckle 106 is arranged in the mounting cavity 115, the limitation of the battery buckle 106 by the mounting hole 114 only has a linear motion degree of freedom close to or away from the battery mounting groove 112, and an end portion of the battery buckle 106 close to the battery mounting groove 112 is arranged to extend out of the mounting hole 114; a buckle reset spring 107 is arranged between one end of the battery buckle 106 away from the battery mounting groove 112 and a side wall of the mounting cavity 115, the buckle reset spring 107 is used for keeping an initial position of the battery buckle 106 in the mounting cavity 115, and when the battery buckle 106 is located at the initial position, one end of the battery buckle 106 close to the battery mounting groove 112 extends into the battery mounting groove 112; and a battery buckle groove hole 25 is provided on one side of the battery body 26, and when the battery 2 is mounted in the battery mounting groove 112, an end portion of the battery buckle 106 is arranged to be embedded in the battery buckle groove hole 25.

Figure 4:
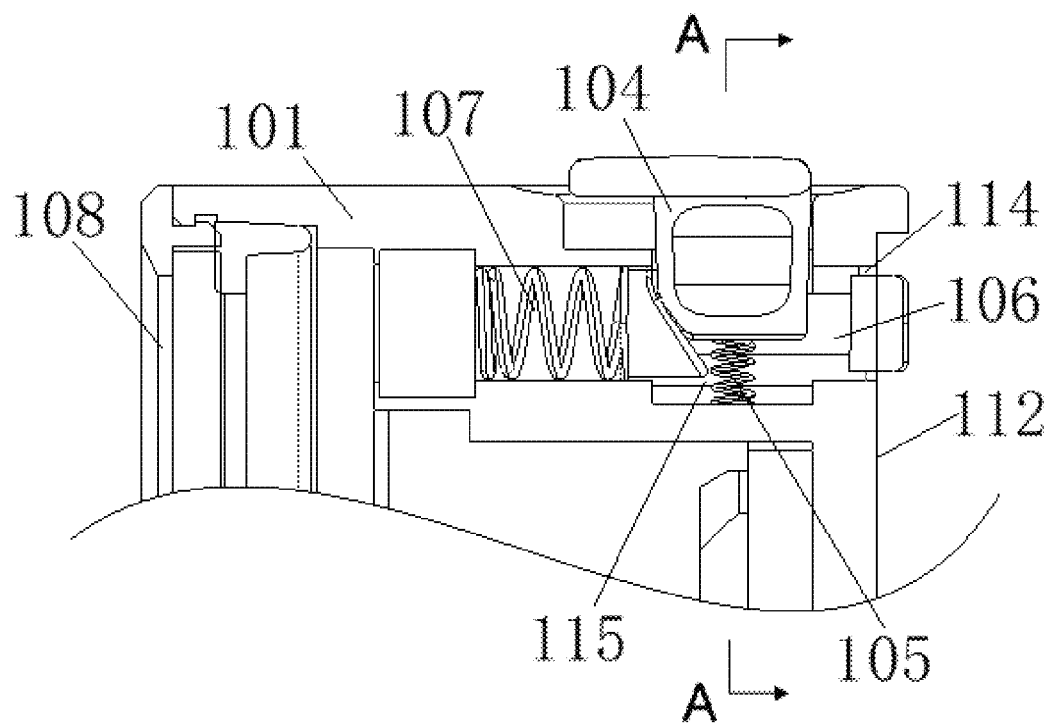
FIG. 4 is a partial cross-sectional view of a battery replacement button and a battery buckle according to an embodiment of the present disclosure.
Figure 5:
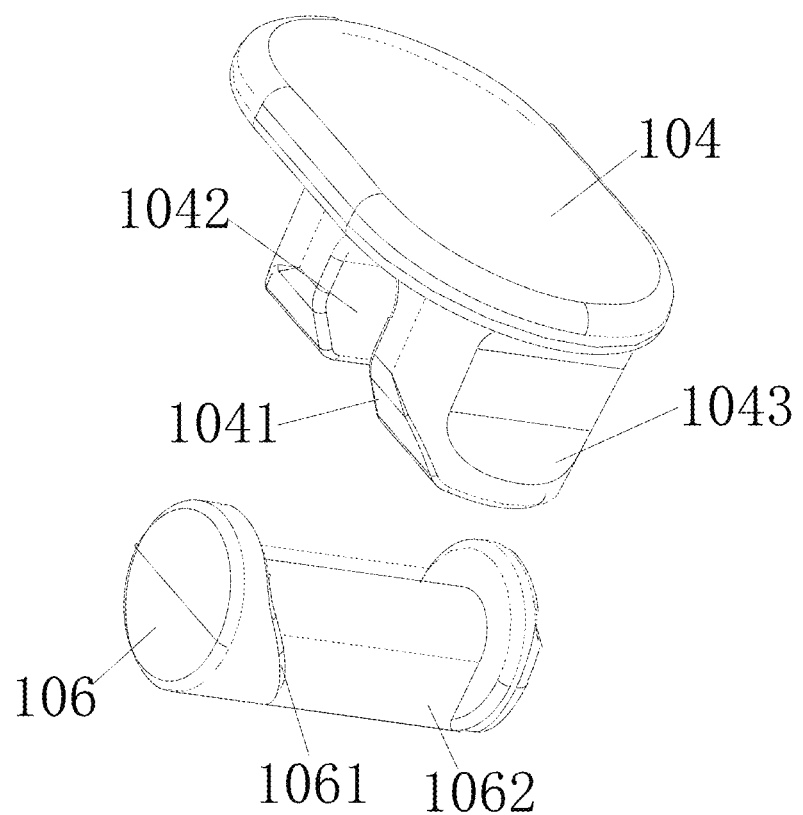
FIG. 5 is a schematic diagram of a matching structure of a battery replacement button and a battery buckle according to an embodiment of the present disclosure.

An opening is provided above the mounting cavity 115 and a battery replacement button 104 is accommodated, and the battery replacement button 104 only has a longitudinal linear motion degree of freedom under constraint of the mounting cavity 115; a bottom of the battery replacement button 104 is connected to a bottom wall of the mounting cavity 115 via a button reset spring 105, specifically, as shown in FIG. 4, a connecting groove 1042 capable of accommodating the battery buckle 106 is formed at the bottom of the battery replacement button 104, the connecting groove 1042 divides the bottom of the battery replacement button 104 into two limiting blocks 1043, and the button reset spring 105 is arranged between bottom surfaces of the limiting blocks 1043 and a bottom surface of the mounting cavity 115; and through grooves 1062 for the limiting blocks 1043 on the battery replacement button 104 and the button reset spring 105 to longitudinally pass through are formed on two sides of the battery buckle 106, so that the battery buckle 106 can be embedded in the connecting groove 1042, and the side surface of the limiting block 1043 and the battery buckle 106 have a contact surface. More specifically, a first inclined surface 1041 is formed on a side face of one of the limiting blocks 1043, a second inclined surface 1061 is formed on one side of the through grooves 1062 close to the battery replacement button 104; when the battery replacement button 104 moves downwards, the two limiting blocks 1043 at the bottom of the battery replacement button 104 move in the through grooves 1062 on the two sides of the battery buckle 106; and the first inclined surface 1041 abuts against the second inclined surface 1061, so that the battery replacement button 104 pushes the battery buckle 106 away from the battery mounting groove 112 when the battery replacement button 104 moves downwards. The battery buckle 106 then disengages from the battery buckle slot 25, thereby unlocking the battery 2 and facilitating its replacement.

A mounting base circuit board 109 is provided at a position in the mounting base 101 below the battery mounting groove 112, the mounting base circuit board 109 is provided with a contact elastic piece 110, a bottom of one side of the contact elastic piece 110 is electrically connected to the mounting base circuit board 109, another side of the contact elastic piece 110 is provided with a protruding portion 116, the protruding portion 116 of the contact elastic piece 110 is not in contact with the mounting base circuit board 109, the protruding portion 116 of the contact elastic piece 110 is exposed in the battery mounting groove 112 by means of an opening at a bottom of the battery mounting groove 112, an auxiliary spring 111 is arranged between the protruding portion 116 of the contact elastic piece 110 and the mounting base circuit board 109, and a sealing piece is arranged between the contact elastic piece 110 and the mounting base 101 to prevent electric leakage.

In one embodiment of the present disclosure, as shown in FIG. 3 to FIG. 7, a bottom of the battery body 26 is provided with an electric quantity indicator light 21 and an electric quantity indication touch button 24, the electric quantity indicator light 21 and the electric quantity indication touch button 24 are electrically connected to the battery circuit board 27, and the electric quantity indication touch button 24 transmits an indication signal displaying electric quantity to the battery circuit board 27 and transmits the indication signal to the electric quantity indicator light 21 via the battery circuit board 27. By pressing the electric quantity indication touch button 24, the remaining battery level of the battery 2 can be displayed via the electric quantity indicator light 21. When the battery 2 is charging, the current battery level of the battery 2 can be known by observing the electric quantity indicator light 21.

In one embodiment of the present disclosure, as shown in FIG. 3 to FIG. 7, the bottom of the battery body 26 is provided with a battery contact point 22, and when the battery 2 is mounted in the battery mounting groove 112, the battery contact point 22 is electrically connected to the mounting base circuit board 109 via the contact elastic piece 110, and the battery power of the battery 2 is conducted through the battery contact point 22 to the mounting base circuit board 109 on the mounting base 101.

Figure 7:
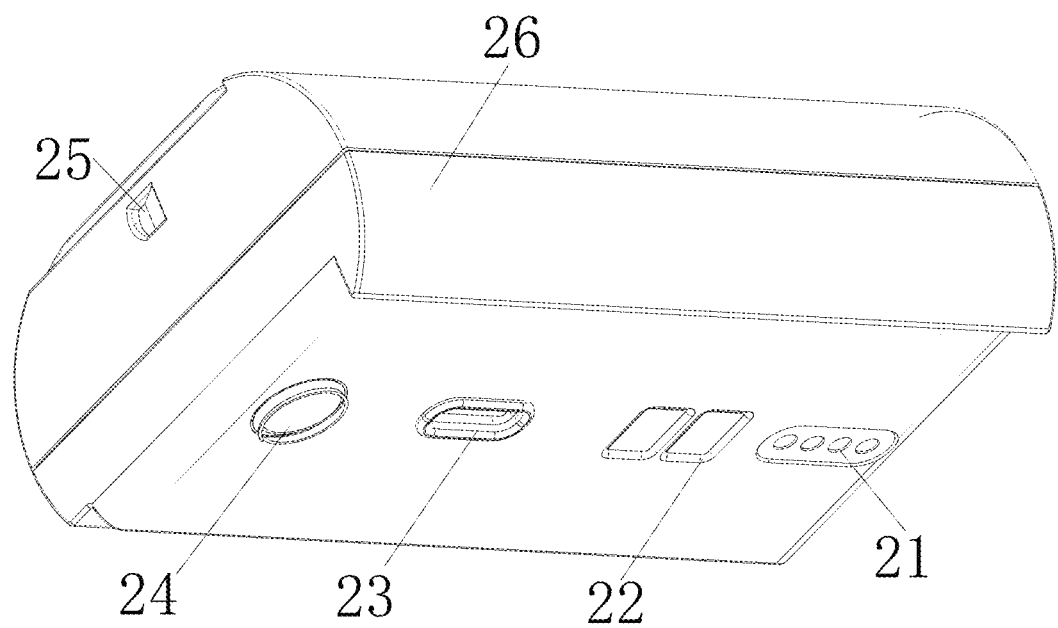
FIG. 7 is a schematic structural diagram of a battery according to an embodiment of the present disclosure.
Figure 8:
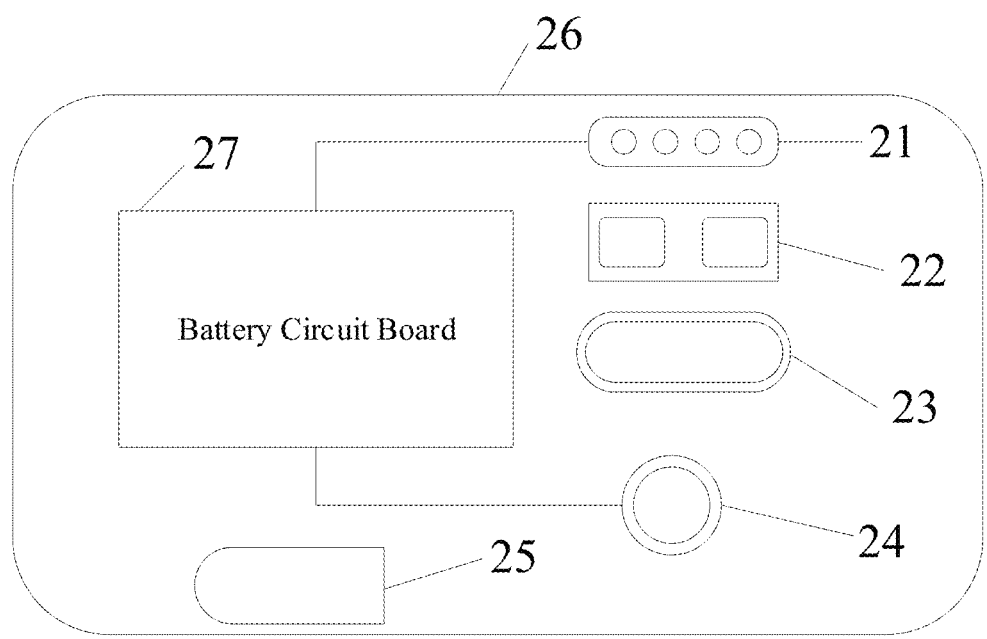
FIG. 8 is a schematic diagram of connection of a battery circuit board according to an embodiment of the present disclosure.
Figure 9:
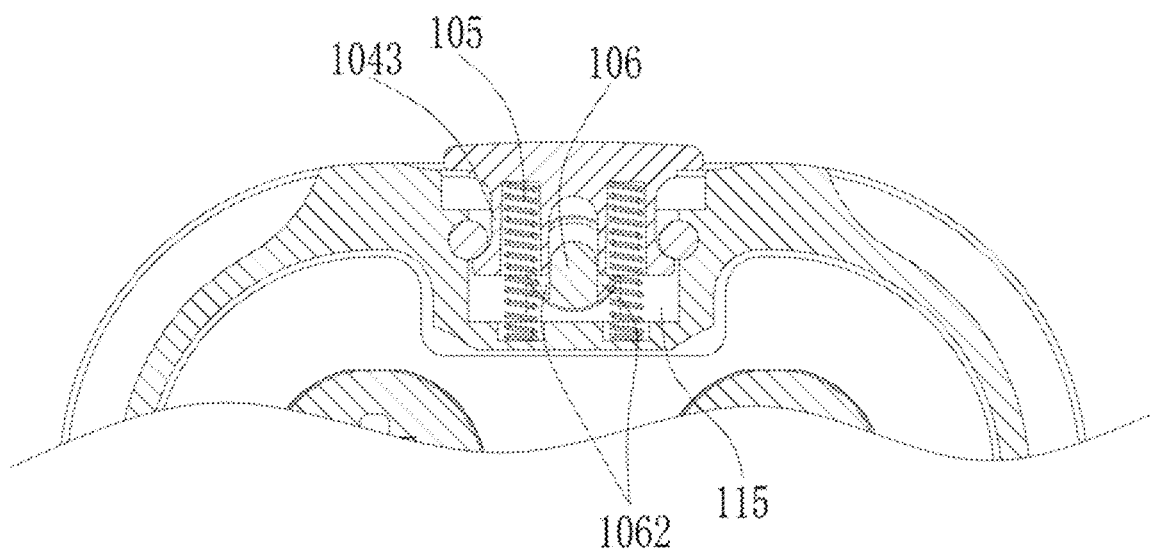
FIG. 9 is a cross-sectional view of FIG. 4 according to an embodiment of the present disclosure.

In one embodiment of the present disclosure, as shown in FIG. 7, the bottom of the battery body 26 is provided with a Type-C socket 23 electrically connected to the battery circuit board 27. By using the corresponding charger, the charger can charge the battery 2 via the Type-C socket 23.

The downward hanging type lamp utilizes the locking screw 103 and the M-LOK nut 102 to securely fasten the lamp body 1, after the battery 2 has been removed, onto the handguard 3. This downward hanging type lamp avoids increasing its size and weight due to the clamping mechanism, and also prevents reducing the battery's 2 installable volume by penetrating through the lamp.

The above-described embodiments only express embodiments of the present disclosure, but should not be construed as limiting the patent scope of the present disclosure. It should be noted that, for those of ordinary skill in the art, several modifications and improvements can be made without departing from the concept of the present disclosure, and these all belong to the protection scope of the present disclosure. Therefore, the scope of protection of the patent of the present disclosure should be determined by the appended claims.

What is claimed is:

1. A downward hanging type lamp, used for being mounted on a handguard of a firearm provided with a modular locking M-LOK® (modular lock) slot, wherein the downward hanging type lamp comprises a lamp body and a battery, the lamp body comprises a mounting base and an illumination lamp, the illumination lamp is mounted inside the mounting base, and the illumination lamp is electrically connected to the battery;

a battery mounting groove is formed on the mounting base, the battery is detachably mounted in the battery mounting groove, a locking screw is arranged in the battery mounting groove, the locking screw penetrates out of a bottom of the mounting base and is connected to an M-LOK® (modular lock) nut, and a head of the locking screw is located in the battery mounting groove;

an accommodating groove is formed in the battery mounting groove at a position where the locking screw penetrates out, and the accommodating groove is used for accommodating the head of the locking screw, so that when the locking screw cooperates with the M-LOK® (modular lock) nut to fix the mounting base on the handguard, a height of a top of the head of the locking screw is equal to or lower than a height of a bottom surface of the battery mounting groove; and the battery comprises a battery body, and a battery circuit board is arranged in the battery body;

wherein a mounting cavity is formed at one end of the mounting base close to the illumination lamp, a mounting hole is provided on one side of the mounting cavity close to the battery mounting groove, and the mounting hole is in communication with the battery mounting groove;

a battery buckle is arranged in the mounting cavity, the limitation of the battery buckle by the mounting hole only has a linear freedom degree close to or away from the battery mounting groove, and an end portion of the battery buckle close to the battery mounting groove is arranged to extend out of the mounting hole;

a buckle reset spring is arranged between one end of the battery buckle away from the battery mounting groove and a side wall of the mounting cavity, the buckle reset spring is used for keeping an initial position of the battery buckle in the mounting cavity, and when the battery buckle is located at the initial position, one end of the battery buckle close to the battery mounting groove extends into the battery mounting groove; and a battery buckle groove hole is provided on one side of the battery body, and when the battery is mounted in the battery mounting groove, an end portion of the battery buckle is arranged to be embedded in the battery buckle groove hole;

wherein an opening is provided above the mounting cavity and a battery replacement button is accommodated, and the battery replacement button only has a longitudinal linear motion degree of freedom under constraint of the mounting cavity;

a bottom of the battery replacement button is connected to a bottom wall of the mounting cavity via a button reset spring, a connecting groove capable of accommodating the battery buckle is formed at the bottom of the battery replacement button, the connecting groove divides the bottom of the battery replacement button into two limiting blocks, and the button reset spring is arranged between bottom surfaces of the limiting blocks and a bottom surface of the mounting cavity; and through grooves for the limiting blocks and the button reset spring to longitudinally pass through are formed on two sides of the battery buckle, a first inclined surface is formed on a side face of one of the limiting blocks, a second inclined surface is formed on one side of the through grooves close to the battery replacement button; when the battery replacement button moves downwards, the two limiting blocks move in the through grooves on the two sides of the battery buckle; and the first inclined surface abuts against the second inclined surface, and the battery replacement button pushes the battery buckle away from the battery mounting groove when the battery replacement button moves downwards.

2. The downward hanging type lamp according to claim 1, wherein a mounting base circuit board is provided at a position in the mounting base below the battery mounting groove, the mounting base circuit board is provided with a contact elastic piece, a bottom of one side of the contact elastic piece is electrically connected to the mounting base circuit board, another side of the contact elastic piece is provided with a protruding portion, the protruding portion of the contact elastic piece is not in contact with the mounting base circuit board, the protruding portion of the contact elastic piece is exposed in the battery mounting groove by means of an opening at a bottom of the battery mounting groove, and an auxiliary spring is arranged between the protruding portion of the contact elastic piece and the mounting base circuit board.

3. The downward hanging type lamp according to claim 2, wherein a bottom of the battery body is provided with an electric quantity indicator light and an electric quantity indication touch button, the electric quantity indicator light and the electric quantity indication touch button are electrically connected to the battery circuit board, and the electric quantity indication touch button transmits an indication signal displaying electric quantity to the battery circuit board and transmits the indication signal to the electric quantity indicator light via the battery circuit board.

4. The downward hanging type lamp according to claim 2, wherein the bottom of the battery body is provided with a battery contact point, and when the battery is mounted in the battery mounting groove, and the battery contact point is electrically connected to the mounting base circuit board via the contact elastic piece.

5. The downward hanging type lamp according to claim 1, wherein the bottom of the battery body is provided with a USB Type-C® (universal serial bus type-c) socket electrically connected to the battery circuit board.

* * * * *